March 29, 1966  H. A. MACKIE  3,243,004
DIAPHRAGM CONSTRUCTION FOR AIR CUSHION DEVICE
Filed May 2, 1962
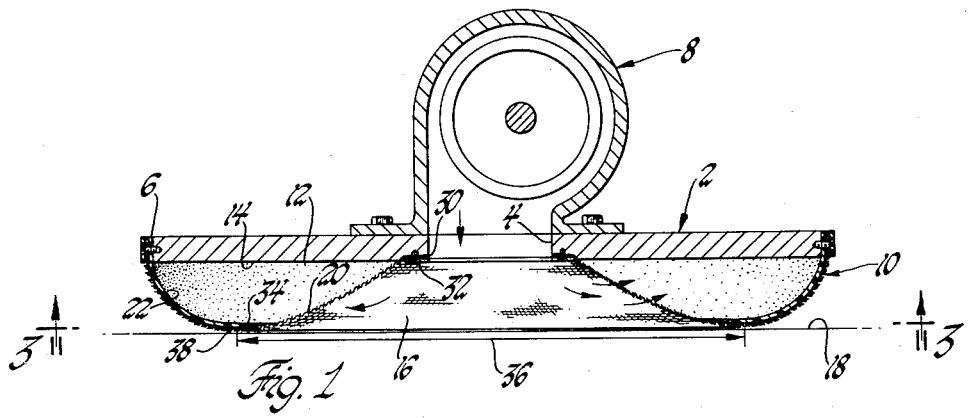
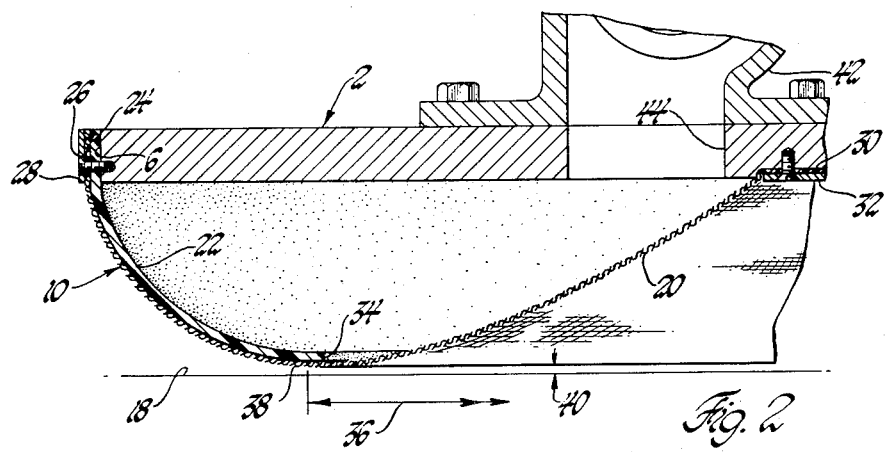
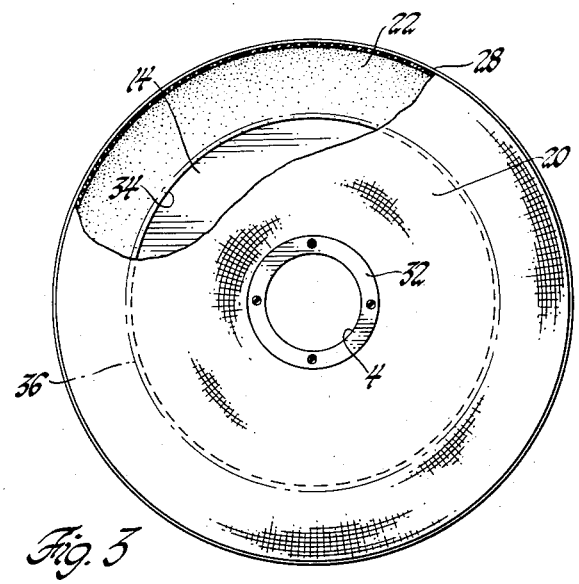
INVENTOR.
Harry A. Mackie
BY
W. F. Wagner
ATTORNEY 3,243,004
DIAPHRAGM CONSTRUCTION FOR AIR
CUSHION DEVICE
Harry A. Mackie, Birmingham, Mich., assignor to General Motors Corporation, Detroit, Mich., a corporation of Delaware
Filed May 2, 1962, Ser. No. 191,802
4 Claims. (Cl. 180—7)

This invention relates to air cushion devices and more particularly to a diaphragm construction therefor.

The present invention is concerned with improvements in air cushion devices of the type shown in copending application Ser. No. 4,465, Mackie et al., entitled Air Cushioned Vehicle, assigned to General Motors Corporation.

An object of the present invention is to provide an improved air cushion device.

Another object is to provide an air cushion device of the type including a substantially flat load bearing platform having an annular flexible diaphragm secured on the underside thereof wherein low pressure air is introduced through an aperture in said platform into the annular cavity formed by the diaphragm and platform and into the generally frustoconical plenum cavity formed between the diaphragm and the ground.

In the above-identified copending application, a so-called ground effect vehicle is provided in the form of a rigid flat platform having a source of low pressure air mounted thereon with suitable ducting through the central portion of the platform to discharge low pressure air into the space between the platform and the ground. An imperforate annular flexible diaphragm is secured at its inner and outer peripheries to the lower surface of the platform and forms an annular cavity which is subject to inflation by low pressure air emitted through the central opening in the platform. In the indicated application, communication between the annular cavity and the plenum cavity is accomplished by segmented openings formed as a part of the attaching means for the inner periphery of the diaphragm.

In copending application Ser. No. 111,290, Harry A. Mackie, entitled Air Cushion Load Supporting Device, and since issued as Patent No 3,161,247, communication between the annular cavity and plenum cavity is accomplished by forming a plurality of apertures in the wall of the diaphragm between the inner periphery thereof and an imaginary circle defined by the lowermost extremity of the diaphragm in inflated condition.

In the present invention, the diaphragm is fabricated and formed in such a way as to eliminate both bypass communicating means between the annular cavity and plenum cavity and the necessity of formed apertures as described above.

According to the general features of the invention, the diaphragm is formed of an annulus of loosely woven fabric which is overlapped by a second annulus of imperforate flexible material having an outer periphery which corresponds to the outer periphery of the loosely woven fabric. The inner periphery of the imperforate material terminates substantially outboard of the inner periphery of the imperforate material so that when both layers of material are secured to the lower surface of a rigid platform and inflated to operating configuration, all of the surface of the diaphragm inboard of the lowermost distended portion of the diaphragm is composed of the loosely woven material, whereby communication between the annular cavity and the plenum cavity is accomplished entirely through the multiplicity of interstices existing in the woven fabric.

Other objects, features and advantages of the invention will become more fully apparent as reference is had to the accompanying specification and drawings wherein:

FIGURE 1 is a sectional elevational view of a schematic form of air cushion device incorporating a diaphragm in accordance with the invention;

FIGURE 2 is an enlarged sectional elevational view of one side of a device similar to FIGURE 1, illustrating the invention in relation to a slightly modified air cushion device; and FIGURE 3 is a bottom plan view, with parts broken away and partly in section, looking in the direction of arrows 3—3 of FIGURE 1.

Referring now to the drawings and particularly FIGURE 1, there is shown a flexible plenum chamber type air cushion device in which the reference numeral 2 designates a load supporting platform. Platform 2 is generally circular in plan form and is provided with a generally circular central aperture 4 extending vertically therethrough in concentric relation with the outer periphery 6 of platform 2. Mounted over aperture 4 on platform 2 is a high volume source of low pressure air in the form of a centrifugal blower 8. Disposed beneath platform 2 is a composite material annular flexible diaphragm 10, which is secured at its inner and outer peripheries to platform 2 in concentric relation with outer periphery 6 and aperture 4 of platform 2.

In accordance with the present invention, diphragm 10 is fabricated and formed so that air generated by blower 8 emerges beneath platform 2 through aperture 4 and simultaneously enters the annular cavity 12 formed between diaphragm 10 and the lower surface 14 of platform 2 and the plenum chamber 16 formed between diaphragm 10 and the ground 18. Simultaneous communication is accomplished by forming diaphragm 10 from a lower annular layer 20 of loosely woven material such as fiber glass. As used herein, the terms "loosely woven" and "porous" are considered to be synonymously descriptive of an open weave fabric or mesh offering minimum resistance to passage of air. Overlying woven material 20 is a second layer 22 of imperforate flexible material such as vinyl film. The outer periphery 24 of vinyl film 22 and the outer periphery 26 of woven fabric 20 are simultaneously secured along the entire circumference of the outer periphery 6 of platform 2 by a circular clamping ring 28, while the inner periphery 30 of layer 20 is secured to the lower surface 14 of platform 2 around the aperture 4 by a clamp ring 32. Vinyl film 22 extends radially inwardly along the surface of woven fabric 20, but terminates in an inner periphery 34 lying slightly inboard of an imaginary circle 36 defined by the lowermost extremity 38 of diaphragm 10 when the latter is in the normal inflated operating configuration illustrated. As a result of the partial overlapping relation of layers 20 and 22, diaphragm 10 permits interchange or communication between cavities 12 and 16 through the open weave of fabric 20, while air loss from annular chamber 16 outboard of the imaginary circle 36 is prevented by the vinyl film 22. Consequently, the composite diaphragm functions in the same manner as a totally imperforate flexible diaphragm by limiting the rate of air discharge from cavity 12 entirely as a function of the depth of throttling gap 40 between diaphragm 10 and ground 18.

The loose weave of the fabric layer 20 of diaphragm 10 not only eliminates the need for either separately formed passages between cavities 12 and 16 or specially cut apertures in the diaphragm, but in addition enables the use of materials such as woven fiber glass which have exceedingly high resistance to abrasion and extraordinary tensile strength. Furthermore, by preforming the vinyl film 22 so that the free end 34 is biased radially outwardly, rapid inflation response of the diaphragm from collapsed position is assured.

FIGURE 2 illustrates a slight modification of the device shown in FIGURE 1 wherein a blower 42 is mounted on the platform 2 so as to discharge air through an aperture 44 directly into the annular cavity 12 rather than directly into the plenum cavity 16. However, because of the open mesh of woven layer 20, it will be evident that no difference in function occurs.

While preferred embodiments of the invention have been shown and described, it will be apparent that other changes and modifications may be made therein. It is, therefore, to be understood that it is not intended to limit the invention to the embodiment shown, but only by the scope of claims which follow.

I claim:

1. In a ground proximity air bearing, a rigid platform, a composite material flexible diaphragm extending beneath said platform, said diaphragm comprising a layer of flexible porous material connected at its center to the central lower surface of said platform, a non-porous annular layer of material overying said porous material and extending radially inwardly a predetermined distance from the outer periphery of the latter, means securing the outer peripheray of both layers of material in sealed relation with the outer periphery of said platform, and means directing superatmospheric air through said platform into the space between said diaphragm and the ground, said porous material enabling superatmospheric air in the last mentioned space to pass freely in the space between said platform and said diaphragm and urge the latter downwardly into a bulged configuration forming a generally frusto-conical plenum chamber beneath said platform with the inner periphery of said non-porous layer extending radially inwardly beyond an imaginary circle defined by the lowermost extremity of the porous material when the latter is in said bulged configuration.

2. The structure set forth in claim 1 wherein said non-porous annular layer is preformed so as to yieldably urge said non-porous material into said bulged configuration.

3. The structure set forth in claim 2 wherein said non-porous annular layer is preformed with a compound curvature corresponding to the compound curvature of the adjacent underlying porous material when the latter is in said downwardly bulged configuration.

4. The structure set forth in claim 3 wherein said porous material comprises woven glass fiber.

References Cited by the Examiner

UNITED STATES PATENTS

| | | | |
|---|---|---|---|
| 1,698,482 | 1/1929 | Nicin | 180—7 |
| 3,078,940 | 2/1963 | Rolle | 180—7 |

A. HARRY LEVY, *Primary Examiner.*